May 29, 1956 L. R. BROWN 2,747,417
COMPLEX MOTION-GENERATING MECHANISM
Filed Feb. 3, 1955 5 Sheets-Sheet 1
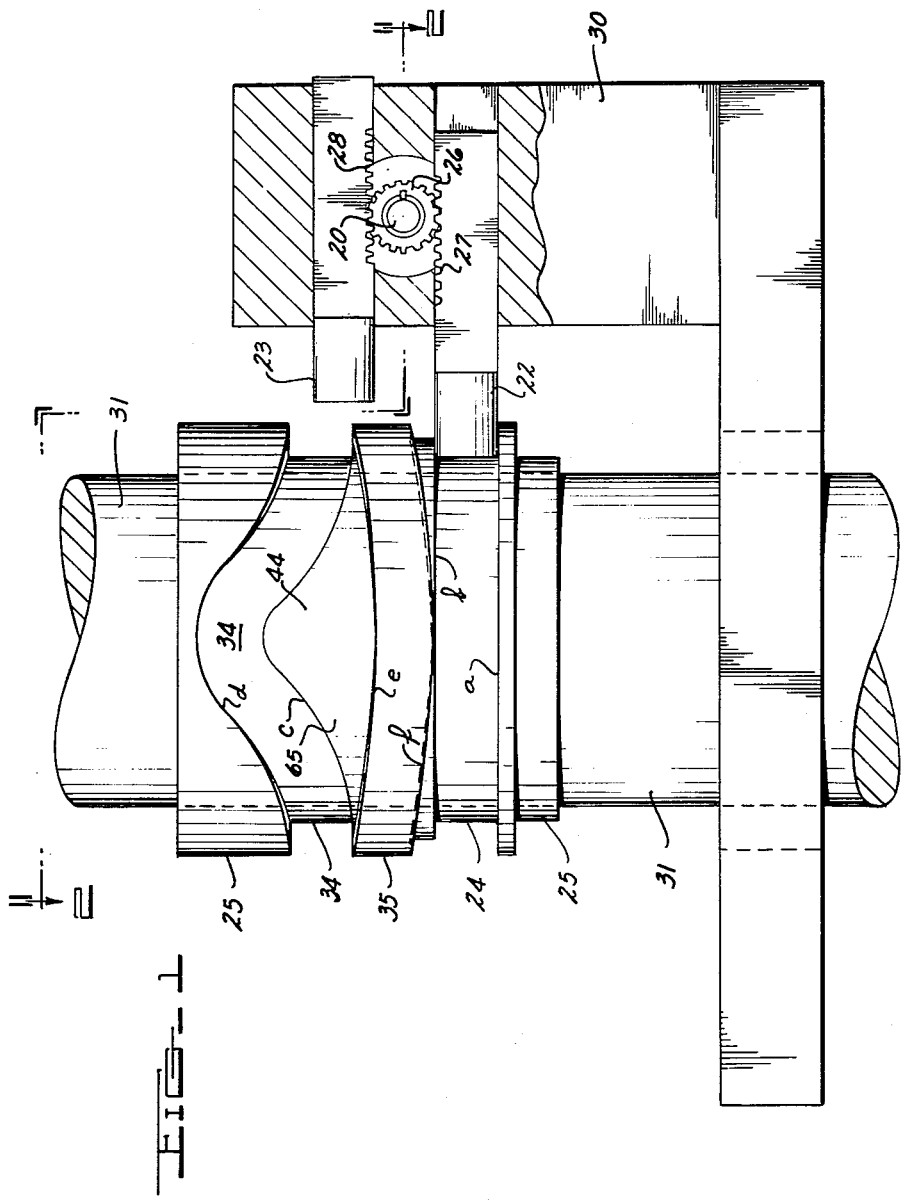
INVENTOR.
LOWELL R. BROWN
BY
SMITH, OLSEN & KOTTS
ATTORNEYS

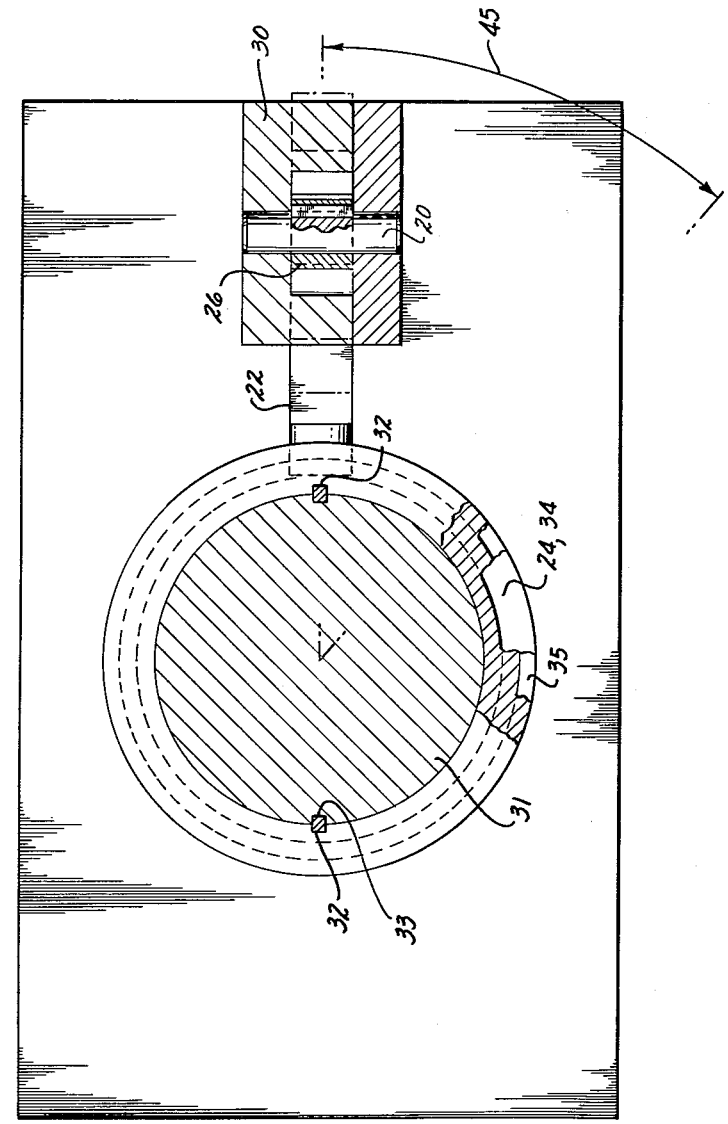

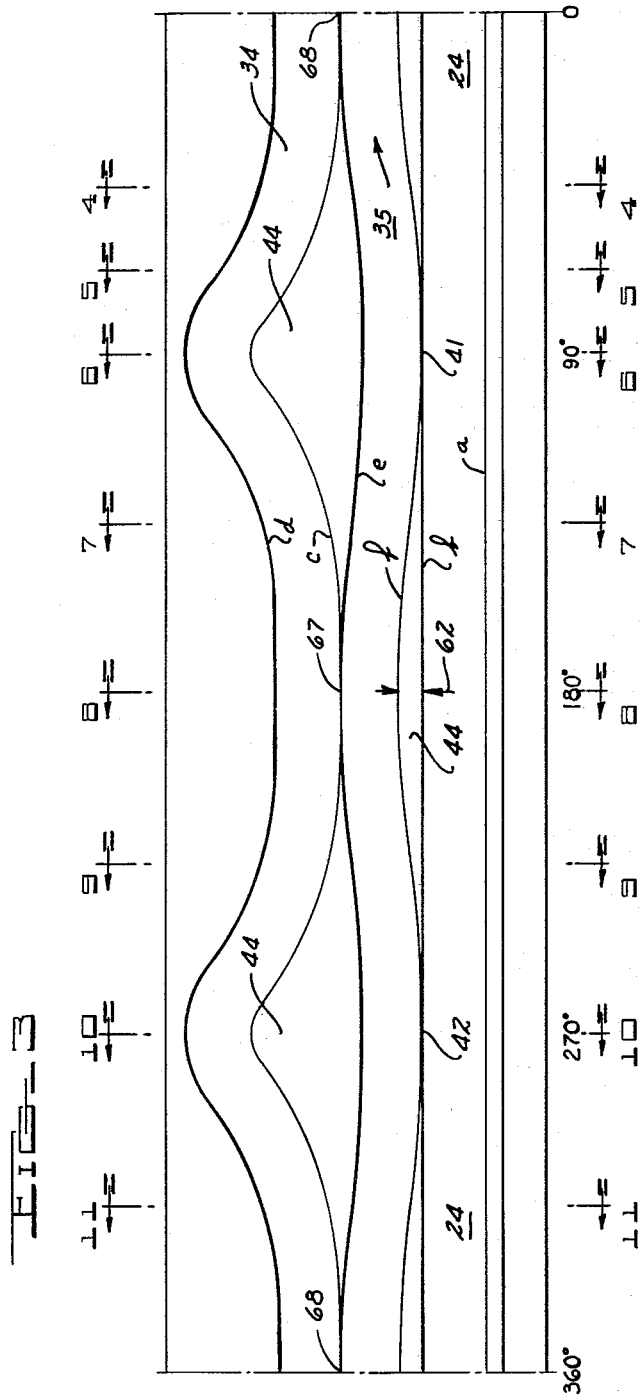

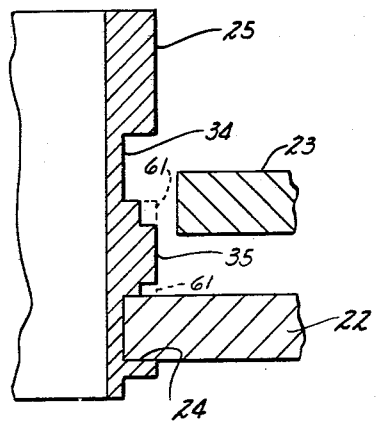
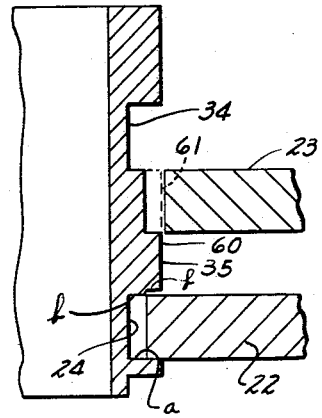
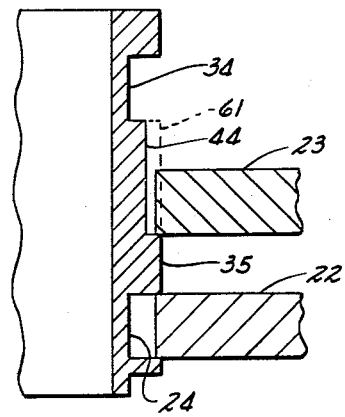
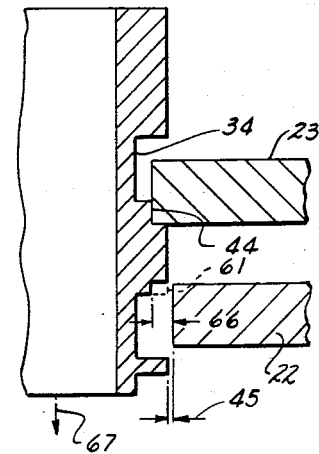

May 29, 1956 L. R. BROWN 2,747,417
COMPLEX MOTION-GENERATING MECHANISM
Filed Feb. 3, 1955 5 Sheets-Sheet 5
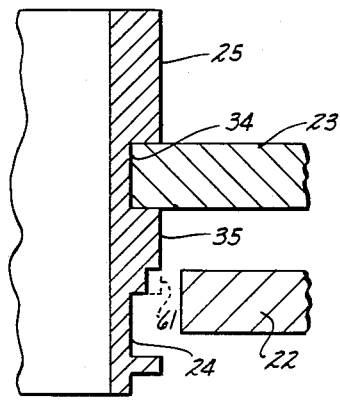
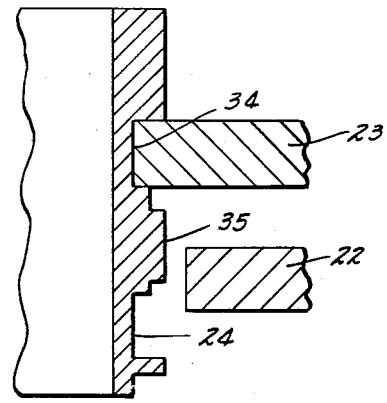
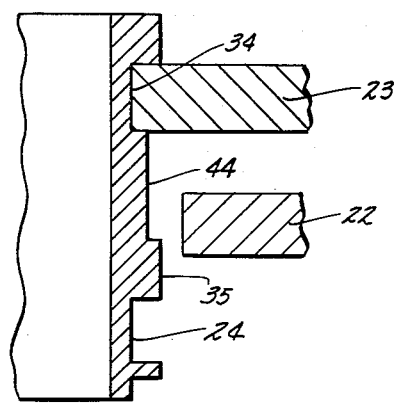
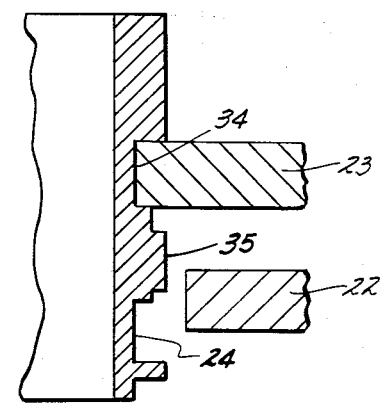
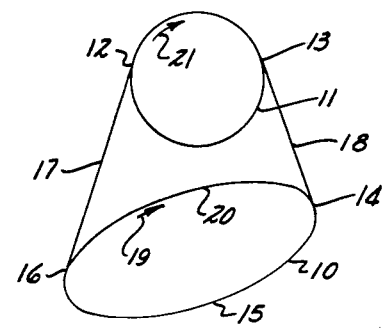
INVENTOR.
LOWELL R. BROWN
BY
SMITH, OLSEN & KOTTS
ATTORNEYS ло́гy employed herein is for the purpose of description and not of limitation.

United States Patent Office 2,747,417
Patented May 29, 1956

2,747,417
COMPLEX MOTION-GENERATING MECHANISM

Lowell R. Brown, Royal Oak, Mich., assignor to Davis Tool & Engineering Company, Detroit, Mich., a corporation of Michigan Application February 3, 1955, Serial No. 485,855

19 Claims. (Cl. 74—57)

This invention relates to improved means for generating complex motions in mechanical devices through the use of cams, cam followers, and other machine elements combined and cooperating so as to produce a desired mechanical movement.

An object of this invention is to provide an improved means for converting rotary into linear reciprocating motion.

A second object of this invention is to provide means for selecting at will one of a multiplicity of reciprocating motions.

A third object of this invention is to provide a motion converting device which is capable of simultaneously converting a portion of the available rotary mechanical energy into reciprocating mechanical energy and yet permit the unimpeded use of the device as a rotary mechanical energy transmitting device.

Still another object of my invention is to provide a multiple cam and cam follower combination in which the cam follower or followers may be engaged to and be mechanically cooperative with more than one cam at the same instant.

Still another object of my invention is to provide means for shifting from one mode of linear motion to another without danger of jamming the cams and cam followers during transition.

It is a further object of my invention to provide means for accomplishing the foregoing objects without affecting the usual ability of cam followers to be shifted in time or geometric phase with respect to a given time or geometric reference.

These and other objects will become more apparent as the description of my invention progresses. For purposes of clarity and ease of description, a specific embodiment of my invention is described. It is to be understood, however, that the limitations of the specific embodiment are not to be construed as limiting the general philosophy of my invention since those skilled in the art will recognize other useful applications and modifications of my invention which still are under the purview of my invention.

Referring now to the figures:

Figure 1 is a side elevation of the cam and cam followers,

Fig. 2 is a view of the cam and follower substantially as viewed along line 2—2 of Fig. 1, Fig. 3 is a diagrammatic peripheral presentation of a particular combination of cams showing the axial displacement of the cam surfaces as a function of rotary angular displacement of the cam, Figs. 4, 5, 6, 7, 8, 9, 10 and 11 are views taken on lines 4—4, 5—5, 6—6, 7—7, 8—8, 9—9, 10—10 and 11—11, respectively, in Fig. 3, and Fig. 12 is a mathematical graph presentation of a certain element of my invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Where a complex motion is produced through the use of a cam and cam follower, it is customary to maintain a fixed relationship between selected cams and cam followers, or where a single cam follower is to be selectively engaged with different cams, it is customary to arrange for stoppage of the cam and follower while the transfer or re-adjustment of the cam to cam follower relationship is made. If manipulation of the cam followers is made while under motion, there is great danger that jamming action will occur with damage to the cams and subsequent damage to the apparatus. Usually such complex camming devices are inaccessibly incorporated in machinery and thus when jammed the entire machine is inoperative until it can be dismantled for repair.

The cams and cam followers of my invention overcome the jamming possibility when shifted while the machine is operative by providing auxiliary transition cams integrally mounted with the customary normal cams, said auxiliary transition cams being operative on the normal cam followers at certain times when the cam followers are also engaged and in normal contact with the normal cam surfaces. By this means the probability of jamming is reduced or eliminated especially where the motion of the cam followers and the separate cams with which they are engaged, are uniquely different, and have no portion of their motion common between them. Thus two entirely different motions may at different times be transmitted to the cam follower, its support, or the cam itself, which motions have no portion of their time-motion cycle in common. It is the philosophy of this invention, in order to prevent the jamming action, and to promote the smooth transition from one state of motion to the other, to provide intermediate transitory motions having elements of their time-motion cycle common to both motions of primary interest. A clearer understanding of the latter statement may be obtained from a consideration of Fig. 12. Fig. 12 depicts a two-dimensional plan of motion that may be produced by two cams and a cam follower. One motion being that produced by engagement of the cam follower in the elliptical cam path 10 and the second motion being produced by engagement of the cam follower in the circular cam path 11. It can be seen that the motions produced by the cams under discussion are not only different types of motion but are also of such character that no point on one cam path (such as on path 11) coincides with any point on the neighboring cam path (such as path 10). Also shown in the diagram of Fig. 12 is a third cam path having elements common to the cam paths 10 and 11 as follows: The arcuate portion of the circle 11 from point 12 to point 13 and the portion 15 of the elliptical path 10 shown between points 14 and 16. The entire cam path herein denoted as the transition cam path is shown by the lines defined by the numerals 12, 13, 18, 14, 15, 16 and 17. Let us presume that at any given time the cam follower is engaged with cam path 10 and is moving in a direction as shown by the arrow 19. If it is the will of the operator, the cam follower will continue to follow the elliptical path generally indicated by the numbers 14, 15, 16 and 20 and will remain in that path for as long a time as the operator desires. In the absence of transition means as provided by my invention, should the operator desire to shift the operation of the cam follower from track 10 to track 11, it would be necessary to stop the machine and make the transfer, or remove the cam follower while the machine is in motion and with great danger of jamming the device, insert the cam follower into the track 11. This requires careful timing on the part of the operator and skillful operation of mechanical accessories. With the present invention, however, inorder to effect the transfer it is only necessary for the operator to make a mechanical adjustment, the nature of which will be made clear as the description of my invention progresses. By the said mechanical adjustment, as the cam follower traversing path 10 approaches the point 16, it is mechanically influenced to travel along the straight line path generally denoted by the numeral 17 and proceeds along the cam path thusly until it intersects the circular path, the first point of approach being that as shown at numeral 12. Upon transfer to the circular path 11, the cam follower may now traverse the circular path 11 so long as it is the will of the operator. Upon his command and the suitable adjustment of the mechanical accessories, the cam follower upon approaching the number 13 in the direction as shown by arrow 21, will leave the circular path 11 and embark on a course defined by the straight line path 18 to the elliptical path 14 and there at that juncture flow smoothly into the path defined by the ellipse 10. It can thus be seen that the transfer of the cam follower to an adjacent cam may be made smoothly and without fear of jamming so long as there exist structural elements in each cam surface which are common elements of a second cam and which do not produce high mechanical accelerations at the instant of transfer of the cam follower from its normal or primary cam to the transition cam.

It can be seen that the transition of the cam follower from cam 10 to cam 11 as diagrammatically portrayed in Fig. 12 through the use of transition cams may on occasion involve more than one cam follower and more than one transition cam. Thus, for the particular cam and cam follower arrangement described herein, five cams and two cam followers are used.

Referring now to Fig. 1, the cam followers are shown at 22 and 23, with cam follower 22 engaging the cam path 24 of the composite barrel cam member 25. The cam followers 22 and 23 are mechanically cooperative with one another through the pinion gear 26 and rack structures 27 and 28 integrally a portion of cam followers 22 and 23. Thus it can be seen that motion of cam follower 22 in either direction is accompanied by the opposite motion of cam follower 23. The motive force for moving the cam followers 22 and 23 derives from the axle 20 on which the pinion gear 26 is affixed. Cam followers 22 and 23 are prevented from any motion other than into or out of engagement with the barrel cam 25 by a bearing support structure generally indicated at 30. The composite barrel cam 25 is slidably mounted on a shaft 31 and restricted from rotational motion relative to said shaft by the key and keyways 32 and 33 shown in Fig. 2. Thus, when the barrel cam rotates by virtue of the rotation of shaft 31, it is also free to move along said shaft under the compulsion of forces derived from the engagement of the cam followers 22 or 23 with cam slots 24 and 34, and in transition with the ridge cam 35. Said ridge cam is so arranged as to engage both cam followers 22 and 23 at the same time when cam followers 22 and 23 are in the positions shown in Fig. 6. Under such conditions, the cooperative combination of cam followers 22 and 23 may be considered a new cam follower.

The walls $a$ and $b$ of slot cam 24, $c$ and $d$ of 34, and the walls $e$ and $f$ of ridge cam 35 may be considered to be the defining boundaries of several cams that are functional in effecting the transition of motion control between primary cams 24 and 34.

The following table will be useful in defining the several cams so defined:

| Cam Name | Cam Structure |
| --- | --- |
| Primary cam 24 | Walls $a$ and $b$. |
| Transition cam (24–35) | Walls $a$, $b$ and $f$. |
| Transition ridge cam 35 | Walls $f$ and $e$. |
| Transition cam (35–34) | Walls $e$, $c$ and $d$. |
| Primary cam 34 | Walls $c$ and $d$. |

In Figs. 4 through 8 are shown the intermediate steps in the transition of the engagement of cam follower 22 in slot cam 24 to the engagement of cam follower 23 in slot cam 34.

Each succeeding figure represents an advancing stage in the transition from complete engagement of cam follower 22 in cam slot 24 to cam follower 23 engaged in cam slot 34, and is a cross-sectional view through the cam followers 22 and 23 and the composite barrel cam 25.

In Fig. 4 the cam follower 22 is totally engaged with slot 24, and follower 23 is totally disengaged from its cam slot 34.

In Fig. 5 cam follower 22 has been retracted from full engagement with cam slot 24 and may now be considered as being under the influence of transition cam (24–35) comprised of cam walls $a$, $b$ and $f$. Cam follower 23 is just out of engagement with the top surface 60 of ridge cam 35.

In Fig. 6 the cam followers 22 and 23 are under the positive control of transition ridge cam 35, and the followers 22 and 23 may be considered as a single follower operative on ridge cam 35.

In Fig. 7 the cam follower 23 is shown in sliding abutment on surface 44, and cam follower 22 is beyond the influence of any of the cam surfaces by virtue of the clearance distances 45 and 66.

In Fig. 8 the rotation of the barrel cam 25 relative to the cam followers 22 and 23 has effectively moved the follower 23 into a position where it may be moved into full engagement with slot 34, and follower 22 is completely inoperative.

In progressing from engagement of the cam follower 22 in cam slot 24 to cam follower 23 in total engagement with cam slot 34, it was necessary for a series of cam and cam follower combinations to occur. The following table lists these combinations in sequential order:

| Figure | Primary Cam Operative | Cam Follower Operative | Transition Cam Operative |
| --- | --- | --- | --- |
| 4 | 24 | 22 | |
| 5 | 24 | 22 | 24–35 |
| 6 | | 22–23 | 35 |
| 7 | 34 | 23 | 35–34 |
| 8 | 34 | 23 | |

The function of the slots defined by ridge cam 35 and surfaces 44 is to provide a number of enlarged pockets into which followers 22 and 23 may extend (Figs. 6 and 7) preparatory to their being projected into slots 24 and 34. Thus enlarged pocket 65 (Fig. 1) permits follower 22 to be withdrawn from slot 24 as soon as follower 23 comes into registry with the enlarged pocket. In this case follower 22 will be withdrawn from slot 24 as soon as member 25 reaches the Fig. 6 position. Follower 23 will automatically be projected into the enlarged pocket (Fig. 6) and ride along wall $e$, thereby forcing barrel 25 down (in the direction of arrow 67 in Fig. 7). When the Fig. 8 position is reached barrel 25 will have been pushed down to such an extent that follower 23 will be in registry with slot 34. If for some reason follower 23 is not pushed home into slot 34 (to the position shown in Fig. 8) no jamming will occur because neither follower 22 nor 23 will be under the influence of a different cam at the same time. Thus if followers 22 and 23 stick in their Fig. 6 positions both followers will be under the influence of ridge cam 35 and no jam-causing forces will be set up in the mechanism.

The advantages of the aforementioned enlarged pockets will perhaps be more apparent if the device and operation thereof is visualized as though this pocket were not present. Suppose therefore that wall $e$ were not present and the areas defined by surfaces 44 were filled in so as to build up a surface 61 as shown by the dotted lines in Figs. 4 through 8.

Assuming the elements were in the Fig. 4 position and it was desired to put follower 23 into slot 34 three operations or movements would need to be gone through (not necessarily in the following order). First, follower 22 would have to be withdrawn from slot 24; second, barrel 25 would have to be moved axially downward a distance equal to that indicated by reference numeral 62 (see Fig. 3); and third, follower 23 would have to be projected into slot 34.

If the aforementioned enlarged pocket 65 were not present the first movement (wherein follower 22 was withdrawn from slot 24) could not be effected because follower 23 would strike surface 61. Instead, some complex mechanism would have to be provided for delaying the movement of follower 23 toward surface 61. The second movement (wherein barrel 25 was shifted axially downward) could only be effected by a second complex mechanism. The third movement (wherein follower 23 was projected into slot 34) could only be effected by a third mechanism. It will be appreciated that the use of an enlarged pocket as proposed by the present invention permits the three desired movements to take place without the employment of any complex delaying or moving mechanisms and without any danger that the followers will jam against the cam members formed on barrel member 25.

It can be seen that in the construction devised by the present inventor the final engagement of the cam follower into its primary cam slot always occurs at a point of confluence between the several cams of low linear velocity. This condition, coupled with the clearance distances 45 and 66 shown in Fig. 7 makes the jamming of the device while in transition an impossibility. The common motion points of cam slot 24 and cam slot 34 with the ridge cam 35 are better shown in Fig. 3. Fig. 3 is a plan view of the periphery of the barrel cam 25 stretched out straight so that all 360 degrees of its surface can be viewed at one time. The path of cam slot 34 thus is as shown in Fig. 3 by the parallel lines $c$ and $d$. Similarly, the path of cam 24 is shown between the parallel lines $a$ and $b$. Likewise the path of ridge cam 35 is shown by the parallel lines $e$ and $f$. It will be noticed that the shape of the cam paths 24 and 34 bear no geometric relationship with one another, and, in fact, are completely independent. It will be noticed, however, and especially as seen in Fig. 3, that the cam paths 24 and 35 have points of common direction of motion at points 41 and 42. At these points wall $b$ of cam slot 24 and wall $f$ of ridge cam 35 are common and a cam follower of the type described herein is engaged both with the ridge cam 35 and the cam slot 24 and is under the influence of both cams at the same instant. A moment later, as the cam follower is engaged with a different angular degree position of the cam, it follows either the slot of cam 24 or the ridge of cam 35 in accordance with the manipulation of the cam followers 22 and 23 effected by the operator by means of the rotation of the pinion 26. An actuating means (not shown) will be associated with shaft 20 or followers 22, 23 in order to provide the desired manipulation of the followers.

It will be noted that in thus describing a specific embodiment of my new multiple cam device, the barrel cam 25 provided with the cams 24, 34 and 35 rotates under the compulsion of shaft 31, and further, since cam followers 22 and 23 are restrained from motion in a direction parallel to the axis of shaft 31, barrel cam 25 is therefore compelled to move in a direction parallel to shaft 31 and at a velocity dictated by the configuration of the several cams comprising the surface of barrel cam 25.

I have found it desirable to so support structure 30 that it may be rotated through a considerable angle, as shown in Fig. 2 at 45. When so adjustable, the phase of the motions produced by the barrel cam 25 and its cooperative engagement with cam followers 22 and 23, may be shifted relative to a reference plane or other condition. Thus, should said reference plane or condition be constantly shifting as in the case of a supporting platform as on a ship at sea or other similarly moving structure, the angular position of cam follower support 30 may be made to follow the angular shift of the supporting structure thus improving the usefulness of my cam invention in problems of navigation and related circumstances.

It will be noted that the usefulness of the cam and related structures described herein is further enhanced by the retention of the rotary motion of barrel cam 25 under the compulsion of shaft 31. Thus the operation of devices mechanically entrained with, and controlled by, barrel cam 25 may include both rotary as well as translational components of motion.

Although the description of my invention has been limited to a five cam, two cam-follower device, it will be apparent that cams and cam followers may be used in numbers greater than those described through the use of mechanical modifications of the described structure without departing from the philosophy of my invention.

For purposes of a correct understanding of the claims which follow this specification a brief reference is here made to various terms used in the claims. Thus barrel member 25 may be viewed as a "circular element." Shaft 31 and keys 32 may be viewed as a "means for causing element 25 to rotate about its axis while permitting it to reciprocate along its axis."

Slots 24 and 34 may be viewed as "two unconnected endless cams." The term "angularly related" as used in the description of cams 24 and 34 will be understood to mean that the cam paths diverge from each other or converge toward each other at one or more points along the periphery of member 25.

The statement in certain of the claims that the followers (22 and 23) are "for reception on alternate ones of the cams" (24 and 34) should be construed to mean that follower 22 engages cam 24 and follower 23 engages cam 34.

Cam member 35 may be considered as having two cam faces $e$ and $f$. Face $e$ may be considered to "merge" with cam face $c$ of cam 34 at points 67 and 68 (Fig. 3) and face $f$ may be considered to "merge" with cam face $b$ of cam 24 at points 41 and 42. Portions of cam 35 at points 41, 42 and 67, 68 may be viewed as "common" to cams 24 and 34 by reason of the fact that portions of the cam walls merge or coincide at these points.

It will be noted from reference to Figs. 3 and 6 that the distance between faces $e$ and $f$ of member 35 at point 41 is smaller than the open distance between followers 22 and 23 only by an amount permissive of mechanical operation of the elements as described. The width of member 35 must be so limited in order that, when follower 22 is being retracted from slot 24, follower 23 will be permitted to enter the enlarged pocket defined by surface 44 (Fig. 6).

During the foregoing specification the invention has been described as it would be employed to produce varying combinations of rotational and reciprocatory movements in a member such as barrel member 25. The invention can, however, be employed to produce varying combinations of translational and reciprocatory movements. In such event, barrel member 25 is replaced with a flat plate having cam surfaces arranged in accordance with the teachings of the invention. By moving the plate in its own plane the plate can, through interaction of the cam surfaces and cam followers, be given varying types of reciprocating movement in the same way that member 25 is given its various reciprocating movements.

Although the illustrated embodiment employs but two cam followers more than two cam followers can be employed.

Having thus described my invention, I claim:

1. A motion generating mechanism comprising a displaceable element, means connected therewith for causing said element to move in one path while permitting said element to reciprocate in another path, first and second angularly related cams on said element, two retractible followers positioned adjacent the element for reception on alternate ones of said cams at different periods, and a transition cam arranged between the first and second cams, said transition cam having cam portions common to portions of at least one of said first and second cams, and means between the followers whereby retractive movement of either follower will be accompanied by an initial movement of the other follower into engagement with the transition cam and a final movement of the other follower into its cam.

2. A motion generating mechanism comprising a circular element, means connected therewith for causing said element to rotate about its axis while permitting said element to reciprocate along its axis, first and second angularly related but unconnected endless cams on the element, each cam having two parallel faces, two retractible followers positioned adjacent the element for reception on alternate ones of the first and second cams, a third cam on the element and having two parallel faces spaced apart a distance equal to the distance between the followers, one of the faces on said third cam merging with one of the faces on the first cam and the other of the faces on the third cam merging with one of the faces on the second cam, and means between said followers for causing one of the followers to move into engagement with the third cam as the other follower is being retracted from engagement with its cam; whereby neither of said followers is ever under the control of its cam when the other follower is under the control of its cam or the third cam, and there is no possibility of any jamming between the followers and cams.

3. A motion generating mechanism comprising a circular element, means connected therewith for causing said element to rotate about its axis while permitting said element to reciprocate along its axis, first and second angularly related but unconnected endless cam slots formed in the element, each slot providing two parallel faces, two spaced followers positioned adjacent the element for reception in alternate ones of said slots, a cam formed on the element to provide two parallel walls, said walls being spaced apart a distance equal to the distance between the followers, one of said walls merging with one of the faces of the first slot and the other of said walls merging with one of the faces of the second slot.

4. A motion generating mechanism comprising a circular element, means connected therewith for causing said element to rotate about its axis while permitting said element to reciprocate along its axis, first and second angularly related but unconnected cams on the element, each cam having two parallel faces, two retractible followers positioned adjacent the element for reception on alternate ones of the first and second cams, a third cam on the element and having two faces spaced apart a distance equal to the distance between the followers, one of the faces on said third cam merging into one of the faces on the first cam and the other of the faces on the third cam merging into one of the faces on the second cam, and means between the followers for causing one of the followers to engage the third cam as the other follower is being retracted from engagement with its cam, thereby causing the element to shift axially into a position where said one follower is in registry with its cam.

5. A motion generating mechanism comprising a circular element, means connected therewith for causing said element to rotate about its axis while permitting said element to reciprocate along its axis, first and second angularly related but unconnected endless cam slots formed in the element, each slot providing two parallel faces, two spaced followers positioned adjacent the element for reception in alternate ones of said slots, portions of said element being cut away to a depth less than that of either of said two slots to form two parallel walls, said walls being spaced apart a distance equal to the distance between the followers, one of said walls merging with one of the faces of the first slot and the other of said walls merging with one of the faces of the second slot.

6. A motion generating mechanism comprising a circular element, means connected therewith for causing said element to rotate about its axis while permitting said element to reciprocate along its axis, first and second angularly related but unconnected endless cams formed on said elements, two retractible followers positioned adjacent the element for reception at different times on alternate ones of said cams, means between said followers for causing either follower to move toward the element simultaneously as the other follower is being retracted away from said element, and cam means on said element responsive to retractive movement of either follower from engagement with its cam for causing the aforementioned element to shift axially from a position where one follower is in registry with its cam to a position where the other follower is in registry with its cam.

7. A motion generating mechanism comprising a circular element, means connected therewith for causing said element to rotate about its axis while permitting said element to reciprocate along its axis, first and second angularly related but unconnected cams formed on said element, each cam having two parallel faces, two spaced followers positioned adjacent the element for reception on alternate ones of the cams, a third cam on the element and having two faces, one of the faces on said third cam merging into one of the faces on the first cam and the other of the faces on the third cam merging into one of the faces on the second cam, the distance between the faces on the third cam at one of the above mentioned points of merger being equal to the distance between the followers.

8. A motion generating mechanism comprising a displaceable element, means connected therewith for causing said element to move in one path while permitting said element to reciprocate in another path, first and second angularly related but unconnected endless cams formed on the element, each cam providing two parallel faces, two spaced followers positioned adjacent the element for reception on alternate ones of said cams, a third cam formed on the element to provide two walls, one of said walls merging with one of the faces on the first cam and the other of said walls merging with one of the faces of the second cam, the distance between the walls at one of the above-mentioned points of merger being equal to the distance between the followers.

9. A motion generating mechanism comprising a circular element, means connected therewith for causing said element to rotate about its axis while permitting said element to reciprocate along its axis, first and second angularly related but unconnected cam slots formed in the element, each slot providing two parallel faces, two spaced followers positioned adjacent the element for reception in alternate ones of said slots, portions of said element being cut away to a depth less than that of either of said two slots to form two walls, one of said walls merging with one of the faces of the first slot and the other of said walls merging with one of the faces of the second slot, the distance between the walls at one of the above mentioned points of merger being equal to the distance between the followers.

10. A motion generating mechanism comprising a circular element, means connected therewith for causing said element to rotate about its axis while permitting said element to reciprocate along its axis, first and second angularly related cams formed on said element, two retractible followers positioned adjacent the element for reception at different times on alternate ones of said cams, and cam means on said element responsive to retractive movement of either follower for causing the element to shift axially from a position where the follower being retracted is in registry with its cam to a position where the other follower is in registry with its cam.

11. A motion generating mechanism comprising a circular element, means connected therewith for causing said element to rotate about its axis while permitting said element to reciprocate along its axis, first and second angularly related but unconnected endless cams formed on said element, each cam having two parallel faces, two followers positioned adjacent the element for reception on alternate ones of said cams, and a third cam on the element having two walls, one of the walls merging into one of the faces on the first cam and the other of the walls merging into one of the faces on the second cam.

12. A motion generating mechanism comprising a circular element, means connected therewith for causing said element to rotate about its axis while permitting said element to reciprocate along its axis, first and second angularly related cams formed on said element, each cam having two parallel faces, two retractive followers positioned adjacent the element for reception on alternate ones of said cams, and a third cam on said element responsive to retractive movement of either follower for causing the element to shift axially from a position where the follower being retracted is in registry with its cam to a position where the other follower is in registry with its cam, said third cam including two walls, one of the walls merging into one of the faces on the first cam and the other of the walls merging into one of the faces on the second cam, the distance between the walls at one of the above mentioned points of merger being no greater than the distance between the followers.

13. A motion generating mechanism comprising a circular element, means connected therewith for causing said element to rotate about its axis while permitting said element to reciprocate along its axis, first and second angularly related but unconnected endless cam slots formed in the element, each slot providing two parallel faces, two spaced followers positioned adjacent the element for reception in alternate ones of said slots, a cam formed on the element to provide two walls, one of said walls merging into one of the faces on the first slot and the other of the walls merging into one of the faces on the second slot, the distance between the walls at one of the above mentioned points of merger being no greater than the distance between the followers.

14. A motion generating mechanism comprising a circular element, means connected therewith for causing said element to rotate about its axis while permitting said element to reciprocate along its axis, first and second angularly related but unconnected endless cam slots formed in the element, each slot providing two parallel faces, two spaced followers positioned adjacent the element for reception in alternate ones of said slots at different periods, portions of said element being cut away to a depth less than that of either of said two slots to form two walls, one of said walls merging with one of the faces on the first slot but being entirely out of communication with either of the faces of the second slot, and the other of said walls merging with one of the faces of the second slot but being entirely out of communication with either of the faces of the first slot.

15. A motion generating mechanism comprising a circular element, means connected therewith for causing said element to rotate about its axis while permitting said element to reciprocate along its axis, first and second angularly related but unconnected endless cam slots formed in the element, first and second retractible followers positioned adjacent the element for reception in respective ones of said slots at different periods, portions of said element being cut away to a depth less than that of either of said two slots to form a wall which merges with one face of the first slot, whereby retraction of the second follower from engagement with the second slot will cause the first follower to move initially into the cut away portion, then ride along the wall, and finally enter the second slot.

16. A motion generating mechanism comprising a circular element, means connected therewith for causing said element to rotate about its axis while permitting said element to reciprocate along its axis, first and second angularly related cams on said element, two retractible followers positioned adjacent the element for reception on alternate ones of said cams at different periods, and a transition cam arranged between the first and second cams, said transition cam having cam portions common to portions of at least one of said first and second cams, and means between the followers whereby retractive movement of either follower will be accompanied by an initial movement of the other follower into engagement with the transition cam and a final movement of the other follower into its cam.

17. A motion producing device comprising a circular element, means connected therewith for causing said element to rotate around its axis but permitting said element to reciprocate along its axis, first and second angularly related but unconnected cam members formed on the periphery of the element, a pair of retractible followers adjacent the element for reception on different ones of the cam members at different periods, means between the followers for causing one follower to move toward the circular element as the other follower is being moved away from said element, said element having portions of its periphery between the cam members contoured to provide a surface which is spaced from the axis of the element a distance intermediate the distances from said axis to the cam-engaging ends of the followers in their extended and retracted positions, whereby when either of the followers is caused to move out of engagement with its cam member the other follower will move into engagement with the contoured surface and thereby permit the follower undergoing retraction to clear its cam member before the other follower is caused to engage the other cam member, thereby preventing jamming between the followers and cam members.

18. A motion generating mechanism comprising a displaceable element, means connected therewith for causing said element to move in one path while permitting said element to reciprocate in another path, first and second angularly related but unconnected endless cam slots formed in the element, first and second retractible followers positioned adjacent the element for reception in respective ones of said slots at different periods, portions of said element being cut away to a depth less than that of either of said two slots to form a wall which merges with one face of the first slot, whereby retraction of the second follower from engagement with the second slot will cause the first follower to move initially into the cut away portion, then ride along the wall, and finally enter the second slot.

19. A motion generating mechanism comprising a displaceable element, means connected therewith for causing said element to move in one path while permitting said element to reciprocate in another path, first and second angularly related cams formed on said element, each cam having two parallel faces, two retractive followers positioned adjacent the element for reception on alternate ones of said cams, and a third cam on said element responsive to retractive movement of either follower for causing the element to shift axially from a position where the follower being retracted is in registry with its cam to a position where the other follower is in registry with its cam, said third cam including two walls, one of the walls merging into one of the faces on the first cam and the other of the walls merging into one of the faces on the second cam, the distance between the walls at one of the above-mentioned points of merger being no greater than the distance between the followers.

No references cited.